No. 759,986. PATENTED MAY 17, 1904.
A. GRAY.
CULTIVATING MACHINE.
APPLICATION FILED AUG. 25, 1903.
NO MODEL.

WITNESSES:
F. P. Britt
E. C. Duffy

INVENTOR
Albert Gray,
BY C. E. Duffy
Attorneys

No. 759,986. Patented May 17, 1904.

UNITED STATES PATENT OFFICE.

ALBERT GRAY, OF PARIS, TEXAS.

CULTIVATING-MACHINE.

SPECIFICATION forming part of Letters Patent No. 759,986, dated May 17, 1904.

Application filed August 25, 1903. Serial No. 170,704. (No model.)

*To all whom it may concern:*

Be it known that I, ALBERT GRAY, a citizen of the United States, residing at Paris, in the county of Lamar and State of Texas, have invented certain new and useful Improvements in Cultivating-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to cultivating-machines, and has for its object to provide a device of this class which is particularly simple in its construction, strong, durable, and efficient.

With this object in view my invention consists in the novel means of manipulating the scraper and cultivator-teeth.

My invention also consists in the novel means of operating the oscillating hoe, and of throwing the same in and out of gear.

My invention also consists in certain other novel features of construction and in combination of parts, which will be first fully described, and afterward specifically pointed out in the appended claim.

Figure 1:
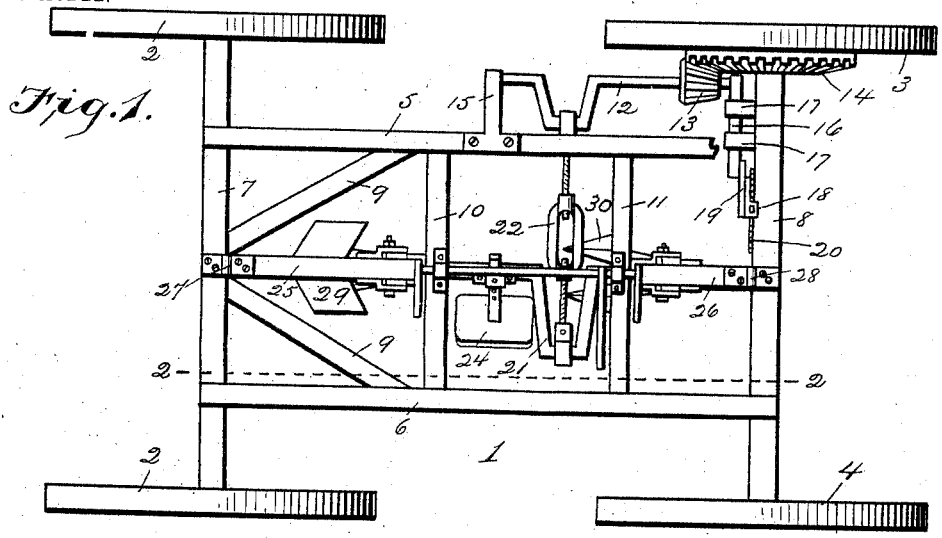
Figure 2:
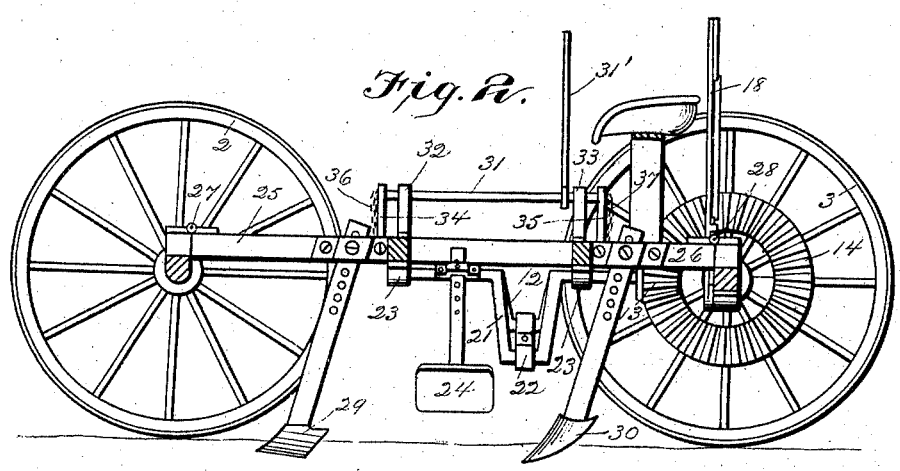
Figures 3, 4:
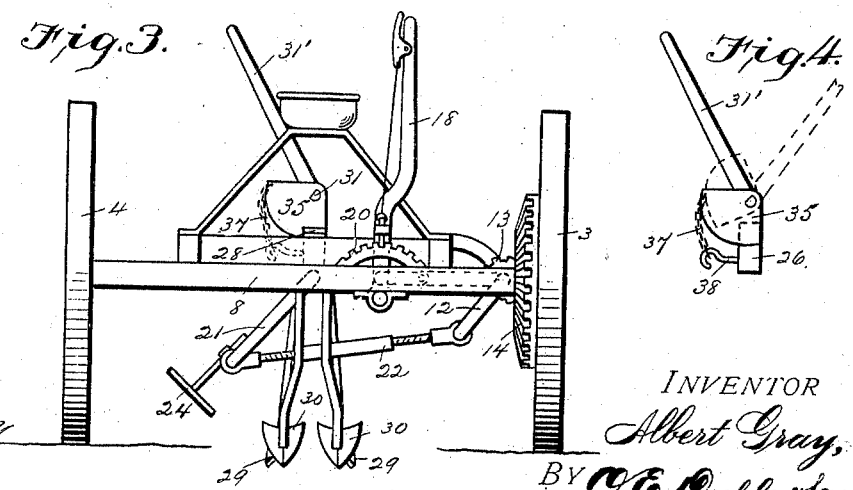

Referring to the accompanying drawings, Figure 1 is a plan view of the cultivating-machine with seat removed; Fig. 2, a longitudinal vertical section taken on line 2 2 of Fig. 1. Fig. 3 is a rear end elevation, and Fig. 4 is a detail of scraper and cultivator-teeth-lifting lever.

Like numerals of reference indicate the same parts throughout the several figures, in which—

1 is a cultivating-machine, having the forward wheels 2, rear wheels 3 and 4, longitudinal frame pieces 5 and 6.

7 and 8 indicate the forward and rear axles, 9 represents suitable braces, and 10 and 11 are the forward and rear cross-supports.

12 indicates a crank-shaft carrying a bevel gear-wheel 13 on its rear end, and 14 indicates a large bevel-gear secured on the wheel 3.

15 indicates a bracket secured on the frame-piece 5, in which the forward end of crank-shaft 12 is journaled, and 16 indicates a slidable rod within which the rear end of said crank-shaft is journaled. Said slidable rod is secured in guides 17, attached to rear axle or bolster, and said rod is connected to a lever 18 by means of a link 19. 20 indicates a suitable locking-quadrant for said lever. Connecting said crank-shaft 12 to an inner crank-shaft 21 is a turnbuckle or other suitable adjustable connection 22. Said inner crank-shaft 21 is suitably journaled on bearings 23, secured to the forward and rear cross-supports 10 and 11, and the crank of said latter shaft has a greater throw than that of the crank in shaft 12. Suitably carried on said crank-shaft 21 is the oscillating hoe 24, the length thereof being capable of adjustment by any suitable means or by that shown in Fig. 2.

25 and 26 indicate longitudinally-arranged forward and rear beams hinged at 27 and 28 to the forward and rear axle or bolsters, and 29 indicates the scrapers forward of the oscillating hoe, while 30 represents the cultivating-teeth in rear of said hoe, said scrapers and teeth being carried on the said hinged sections 25 and 26 and adjustably secured thereon, as shown.

31 indicates a rocking shaft suitably journaled in the brackets 32 and 33, secured on the cross-supports 10 and 11. On the ends of said rocking shafts I provide two cam members 34 and 35, Figs. 3 and 4, and to their upper corners I secure chains 36 and 37, which connect to a hook 38 or other means secured to the hinged members 25 and 26. It will be seen that said rocking shaft is located directly over the hinged members 25 and 26, as shown in Figs. 1, 3, and 4.

Having thus set forth the several parts of my invention, its operation is as follows: The crank-shaft 12 is revolved by the wheel 3 and rocks the crank-shaft 21, carrying the hoe 24. In order to throw the said shafts out of gear with the wheel 3, the lever 18 is pulled to the left, which on account of link 19 draws the sliding member 16 to the left, thereby carrying the bevel-pinion 13 out of engagement with the bevel-gear 14. The scrapers 29 and cultivator-teeth 30 are also capable of being raised out of contact with the ground, which is accomplished by simply throwing lever 31' to the right, which raises the chains 36 and 37 and lifts the hinged members carrying the scrapers and cultivator-teeth. In order to securely and solidly hold the said scrapers and cultivator-teeth in an operative position, as shown in Figs. 2 and 3, I have arranged the cam members 34 and 35, which engage the tops of the hinged members and hold the same firmly and rigidly in position. As the lever 31' is pushed to the left, the cams 34 and 35 more forcibly engage the hinged sections carrying the scrapers and cultivator-teeth.

Having thus set forth my invention, I do not wish to be understood as limiting myself to the exact construction herein set forth, as various slight changes may be made therein by those skilled in the art which would fall within the limit and scope of my invention, and I consider myself clearly entitled to all such changes and modifications.

What I claim as my invention, and desire to secure by Letters Patent of the United States, is—

In a cultivating-machine, the combination of a crank-shaft, a bevel-pinion thereon, intermediate the ends thereof, a driving-wheel and bevel-gear adapted to revolve said crank-shaft, a crank-shaft having a greater throw, and means for connecting said crank-shafts together, a hoe carried on said latter crank-shaft, a sliding member within which the rear end of said former crank-shaft is journaled, and means for sliding said sliding member to carry said former crank-shaft laterally out of engagement with said driving-wheel and bevel-gear, substantially as described.

In testimony whereof I affix my signature in presence of two witnesses.

ALBERT GRAY.

Witnesses:
L. P. HARRISON,
CRAIG ALEXANDER.